United States Patent
Haynes

(10) Patent No.: US 9,428,403 B2
(45) Date of Patent: Aug. 30, 2016

(54) LARGE SCALE INSULATED DESALINATION SYSTEM

(75) Inventor: Joel Haynes, Tarzana, CA (US)

(73) Assignee: H2O GLOBAL LLC, Los Angeles, CA (US)

( * ) Notice: Subject to any disclaimer, the term of this patent is extended or adjusted under 35 U.S.C. 154(b) by 817 days.

(21) Appl. No.: 12/902,011

(22) Filed: Oct. 11, 2010

(65) Prior Publication Data

US 2012/0085635 A1    Apr. 12, 2012

(51) Int. Cl.
| | | |
|---|---|---|
| C02F 1/06 | (2006.01) | |
| C02F 1/14 | (2006.01) | |
| B01D 1/00 | (2006.01) | |
| B01D 1/18 | (2006.01) | |
| B01D 5/00 | (2006.01) | |
| C02F 1/12 | (2006.01) | |
| C02F 103/08 | (2006.01) | |

(52) U.S. Cl.
CPC ............... C02F 1/14 (2013.01); B01D 1/0035 (2013.01); B01D 1/0094 (2013.01); B01D 1/18 (2013.01); B01D 5/006 (2013.01); C02F 1/06 (2013.01); C02F 1/12 (2013.01); C02F 2103/08 (2013.01)

(58) Field of Classification Search
CPC .......... C02F 1/06; C02F 1/14; B01D 1/0035; B01D 1/0094; B01D 1/18; B01D 5/006
USPC .......... 203/11, 40, 47, 86, DIG. 1, DIG. 17; 159/3, 48.1, 48.2, 903, DIG. 16
See application file for complete search history.

(56) References Cited

U.S. PATENT DOCUMENTS

| | | | | |
|---|---|---|---|---|
| 3,163,587 | A * | 12/1964 | Champe | 202/176 |
| 3,960,668 | A * | 6/1976 | Rush | 202/185.1 |
| 5,053,110 | A * | 10/1991 | Deutsch | 202/176 |
| 5,348,622 | A * | 9/1994 | Deutsch et al. | 202/176 |
| 5,729,987 | A * | 3/1998 | Miller | 62/98 |
| 5,772,850 | A * | 6/1998 | Morris | 202/237 |
| 7,897,019 | B2 * | 3/2011 | Akers | 203/10 |
| 8,444,830 | B2 * | 5/2013 | Davey | 203/10 |

* cited by examiner

Primary Examiner — Renee E Robinson
Assistant Examiner — Jonathan Miller
(74) Attorney, Agent, or Firm — Cislo & Thomas, LLP

(57) ABSTRACT

An apparatus and method for the distillation of ocean and brackish water that includes insulation for preventing heat from escaping to the atmosphere is disclosed. The insulation comprises a second wall surrounding the basic assemblies of a desalination system in which the space between the second wall and basic assemblies is under low partial vacuum and is partially or totally filled with an insulation material for structural support. The system allows for flash evaporation of heated input water and condensing the resultant vapors into pure distilled water. The heat of condensation as well as heat from the salt byproduct may be recaptured and used to preheat the input contaminated water.

4 Claims, 3 Drawing Sheets

SOLAR COLLECTOR FIELD

LARGE SCALE INSULATED DESALINATION SYSTEM

CROSS-REFERENCE TO RELATED APPLICATION

Not Applicable

FEDERALLY SPONSORED RESEARCH

Not Applicable

SEQUENCE LISTING OR PROGRAM

Not Applicable

STATEMENT REGARDING COPYRIGHTED MATERIAL

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND

The present invention relates primarily to methods of improving the efficiency, and reducing operational and capital costs, of desalination systems. More particularly, to desalination systems that distill brackish or ocean water.

Fresh water is a scant 2.5% of the total global water supply and 69% of that is represented by permanent snow glaciers. The remaining 97.5% is salt water. Since 1940, the amount of fresh water used by humanity has roughly quadrupled as the world population doubled. Given the finite nature of the earth's fresh water resources, such a quadrupling of worldwide water use probably cannot occur again. In many of the regions where the world population is growing most rapidly, the needed water is not available. Desalination of seawater represents the best source of fresh water to satisfy needs.

Desalination Systems

Throughout the world today, all desalination facilities combined produce about 26.5 million cubic meters (approx. 7 billion gallons) of desalinated water per day. These facilities basically utilize only two technologies, membrane filter processes and thermal distillation processes. Of these processes reverse osmosis (membrane) and multi-stage flash distillation (thermal) make up and share about 80% of the world market.

Reverse Osmosis uses high pressure pumps to force fresh water through a semi-permeable membrane, leaving the salt behind. This process requires seawater pretreatment, an electrical power source, chemical post-treatment and annual membrane replacement.

Multi-Stage Flash (MSF) involves introducing heated sea water into multiple, reduced pressure chambers that cause a portion of the water to instantly flash (boil) into water vapor. The vapor is then condensed into distilled water. This process requires an energy source for heating the seawater as well as control functions.

Both technologies are energy intensive and both convert about 50% of the input sea water into fresh drinkable water, discharging the remaining brine solution back into the ocean, which results in an ever increasing environmental problem.

Other related technologies involve solar collectors (flat plate collectors, evacuated tube collectors, parabolic trough collectors) and low temperature flash desalination.

Flat plate collectors are used primarily for apartments and residential water heating applications. The efficiency of flat plate collectors depend mostly on the quality of insulation, the design of absorber plates, and heat transfer methods. Present day designs are limited to applications that require temperature less than 150° F. The collectors operate well even in hazy weather conditions.

Evacuated tube collectors are also used for apartments and residential water heating applications. Evacuated tube collectors concentrate the solar radiation on absorber tubes. The insulation quality of the evacuated tubes provides operating temperatures up to 200° F. The collectors are limited to clear weather conditions.

Parabolic trough collectors are more often used for applications that require high temperature for steam generation (electric power plants). Parabolic trough collectors use reflective surfaces to concentrate the solar radiation into liquid filled absorber tubes and provide operating temperatures above 600° F. The concentration of the energy onto the smaller absorber tubes provides methods for more efficient insulation and heat conservation. The collectors use automatic sun tracking to keep the collectors facing directly into the sun. The collectors are limited to clear weather conditions, require complex alignment, and are subject to high wind damage and maintenance cost.

Only a few large scale desalination plants throughout the world use solar energy as an energy source due to the large solar collector fields required and the associated high capital costs.

Low Temperature Flash Desalination: The past decade has seen a huge increase in research and development in desalination projects around the world utilizing improved technologies, resulting in efficiency and reduced capital costs. Numerous patents have been granted disclosing designs that improve efficiency. A large number of these patents involve the "flash desalination" of water at low, near ambient temperatures in an effort to reduce energy requirements. Although sea water can be evaporated at low temperatures by decreasing pressure (partial vacuum), the decreasing temperature results in an exponential decrease in the Vapor Saturation Density. Therefore, large quantities of vapor must be transferred to recover significant quantities of distilled liquid, which places much higher energy and costs requirements upon the vacuum system.

PRIOR ART

There are many non-solar systems that produce millions of gallons of distilled water per day using a relatively small base area, but these systems use non-recoverable energy sources with recurring costs and environmental issues.

U.S. Pat. No. 6,932,889 issued to Holcomb discloses a point of use water purification unit for continuously and completely purifying water at all points of use for removing all chemicals and killing all microorganisms. The device has a computer monitored and controlled system for degassing, super heating and exploding water into a vacuum chamber, condensing the steam in a counter current cold brine apparatus and storing it in a holding tank. However, this system provides no means for insulation and the solutions are heated to temperatures as high as 260.degree. F. and chambers as high as 360.degree. F.—The higher the difference in temperature from ambient temperature, the greater will be the energy heat loss—resulting in poor efficiency and high operating costs. The invention also requires a very large number of redundant components (e.g., heat exchangers, refrigeration unit, pumps and motors, etc.) that would result in huge capital equipment and operation costs.

U.S. Pat. No. 6,699,369 issued to Hartman discloses a method for removing dissolved solids, particularly salts, from water, and an apparatus for performing the inventive method. The aqueous solution to be treated, for example sea water, is atomized using special non-pneumatic nozzles, and sprayed into an evaporation chamber through which air, heated by waste heat, is blown. The microdroplets undergo rapid evaporation in the chamber, resulting in the separation of the salt solids from the vapor phase of the water. The mixture of suspended solids and water vapor is filtered to remove and collect the salts, and the water vapor is condensed to collect the salt free water. This invention is primarily designed to use industrial waste heat in the form of hot air, but makes no provision to insure that the air does not contain chemicals that could contaminate the purified water. If waste heat were not available and solar energy is used, then the large solar area necessary would result in huge capital cost.

U.S. Pat. No. 6,355,144 issued to Weinstein discloses a high output solar fluid distillation system that can distill a variety of fluids such as water or ethyl alcohol. The distillation system uses a fluid feed system that collects source fluid and adds surfactant to improve wetting properties of the source fluid, and uniformly feeds the fluid to the evaporator. Uniquely designed multiple effect chambers expose the source fluid to multiple solar flux effects to condense a portion of the source fluid into distilled fluid. A fluid drain system separates the distilled fluid from the source fluid, while a front cooling mechanism removes external energy from the distillation by a combination of evaporation, convection and radiation. The resulting distillation system overcomes the high cost and complexity of present high performance solar distillation devices and produces more fluid per cost than low-tech versions. The transparent partitions for each effect chambers are used to condense the vapors. However, there is no provision for cooling the top plate that must absorb the "heat of condensation", which results in lower condensing and lower efficiency. The increase in the number of transparent partitions also decreases the total radiation the reaches the absorber at the bottom of the last partition which decreases the efficiency. This type of design also results in high heat energy loses to the atmosphere.

U.S. Pat. No. 6,299,735 issued to Lumbreras discloses an array of sonic hydraulic nozzles for injecting a mixture of water with dissolved or suspended particulate into a chamber to form a continuous spray of spherical droplets. Low pressure areas form in the wakes of the droplets which promotes a phase change and evaporation upon being submerged in heat vortices created along the edges of the sonic shock waves. All dissolved and/or suspended solid particles in the mixture precipitate from the spray upon the vaporization of the water. Shortly thereafter, the particle-free vapor re-condenses into a dense water mist of substantially pure water, while releasing the excess heat captured in the evaporation vortices. The water mist then is absorbed by nucleating screens located above the nozzles. The screens concentrate the dense mist into water streams through a channel running out of the apparatus. The invention makes efficient use of the latent heat present in ambient air to supply all phase change energy requirements to affect a very low cost solid-liquid separation. The invention is dependent upon high sonic velocities for proper operation that is generated by the sonic nozzles. The nozzle includes a sharp leading edged orifice that produces the resultant "Vena Contracta" that creates a low pressure area sufficient to draw ambient air into the nozzle that produces higher velocities. The total force required must be supplied by the water input pump resulting in high electrical energy input and operating costs. The Orifice is subject to chemical and mechanical erosion that reduces the "Vena Contracta" and jet stream. Also vapor density at ambient temperature is very low (17 grams/M^3) that would require a very large chamber space, greatly increasing capital equipment costs.

U.S. Pat. No. 6,254,734 issued to Sephton discloses a process for the evaporation of an available warm or hot liquid under a vacuum by applying a pressure drop thereon initiating flash-down evaporation, and followed by further flash-down evaporation under an applied pressure gradient whereby the residual liquid is raised by the vapor produced to an elevation sufficient for subsequently discharging the residual liquid from vacuum without a pump; and by separating the vapor phase from the residual liquid phase before condensing the vapor produced into distilled liquid. The invention provides no means for insulation and will exhibit poor efficiency. The invention is primarily designed to use "Solar Ponds" that are inherently inefficient and require large solar areas, but are low in capital cost. If solar collectors were used instead of solar ponds the capital cost would be very high.

U.S. Pat. No. 5,207,928 issued to Lerner discloses a method of saltwater desalination and fresh water recovery comprised of spraying a mixture of saltwater droplets substantially in the range of 7 to 30 microns in diameter and compressed air with a mass flow ratio of about one part compressed air to 10 parts saltwater droplets. The mixture of salt water droplets are not heated, and along with the compressed air, are sprayed into a chamber at a velocity of at least 200 meters per second. This is done to progressively vaporize the saltwater droplets for effectuating precipitation of dissolved impurities and salts from the vaporizing saltwater droplets and accumulation of a fresh water droplet suspension within the chamber and evacuating the accumulated fresh water droplet suspension out of the chamber. The rate of evacuating is controlled by a blower to maintain the fresh water droplets in suspension. Finally, fresh water droplets from the evacuated freshwater droplets suspension are washed and the fresh water is collected. However, to desalinate 30,000 gallons per day (medium scale) would require eight of the example systems with the associated pumps and controls, which would make the system capital equipment and operating cost very high. The invention does not provide means for extracting the salt and for controls for the off/on cycling operation of the air pump.

U.S. Pat. No. 5,053,110 issued to Deutsch discloses a solar-operated apparatus to purify and/or desalinate water. Several embodiments are disclosed, each of which substantially derives its source of heat from solar energy. The apparatus includes a unique design of the evaporating collector dome which is provided with a smooth interior surface to permit collection of increased amounts of distillate. The apparatus exterior is provided with a black surface to serve as a black body and so absorb increased amounts of the sun's energy. Additionally, that same exterior is coated with a film of infra-red absorbing material (STET) to further increase solar-energy absorption. To further improve the system's efficiency, various external tubing designs are utilized to preheat the load prior to its entry into the evaporating chamber. The distillate-collecting vessel is a downwardly-extending dome. This increases the volume while at the same time reducing re-evaporation by minimizing the exposed surface area. Additionally, locating the apparatus on the side of a hill or other elevated topography, permits a further increase in overall system-efficiency by using gravity to force the distillate through a turbine/generator for co-generation of electricity. The co-generation of electricity further increases the overall system efficiency. However, there is no means provided to protect the absorber copper tubes surrounding the dome of the invention from the outside environment, therefore heat energy will transfer through convection to ambient air resulting in inefficiency. The invention is limited to installation sites that are favorable to sun-hillside relative locations.

Despite the foregoing inventions, research, developments and improvements, the seawater desalination processes continues to be an intensive fossil energy consumer.

Methodology

When considering the technical aspects of using solar energy for heating water to be converted to distilled water, the following facts should be considered:

1. The maximum solar energy that reaches the earth's surface at sea level near the equator is 1,070 wh/m^2 (340 btu/ft^2.hr). This energy decreases with latitude, area weather conditions, and time of year and hour of day.

Example: Total solar radiation on a surface at 40° north latitude.

June 6; 6 am:pm=60 btu/ft^2.hr to 12; 12 am:pm=304 btu/ft^2.hr

December 6; 6 am:pm=14 btu/ft^2.hr to 12; 12 am:pm=143 btu/ft^2.hr

Ref: Marks' Standards Handbook

2. The amount of solar energy that falls on a square foot of our planet is a constant. It does not improve by using batch collectors, concentrators, evacuated tube collectors or flat plate collectors.

3. The saturated vapor density of water varies as a non-linear function of temperature. Note: In a closed container, water will vaporize until the space about the water surface is saturated. The saturated vapor must be removed before further vaporization can occur. The quantity of moisture within the saturated vapor is dependent only upon vapor temperature.

Example A: At 40° C. (104° F.), saturated vapor density is 51.1 gm/m^3 (3.98 lbs/ft^3). At 95° C. (203° F.), saturated vapor density is 505 gm/m^3 (39.32 lbs/ft^3).

Example B: A system that is to produce 56 m^3 (14,793 gal) of fresh water per 10 hr solar day at a temperature of 40° C. must move vapor at a rate of more than 1838 m^3 per minute. But at 95° C. it would need only to move 180 m^3 per minute.

4. There are three ways that heat may be transferred: Conduction, Convection and Radiation (Note: In evacuated space, heat can only be transferred by radiation).

When considering the above, it becomes obvious that the most logical way to make large scale solar desalination economically viable is to reduce the solar collector field. While less solar area reduces cost, it also reduces available solar energy. To offset the energy loss, the heat energy must be used more efficiently and reused over and over again. This requires that very little heat energy, above the input solar sea water temperature, be allowed to exit the system.

Fortunately, after converting the solar radiation into heat energy, the distillation process does not require converting heat to another energy form. Therefore, the solar heat energy, once used to distill water, may be removed in heat exchangers and condensers to preheat the incoming sea water before it enters the solar collector.

As the available heat energy increases throughout the day, the flow of distilled water will increase until the heat loss to the atmosphere from the system equals the heat energy input from the solar radiation. This process is limited only by the quality of the insulation and the efficiency of the heat exchangers and collectors.

The best heat insulator is evacuated space. The insulation method to be used for the distillation system is similar to the ordinary THERMOS® bottle. However, the THERMOS® bottle would be considerably more efficient if the cap were also insulated with evacuated space. Therefore, it is important to minimize the coupling materials that can bypass the evacuated space insulation.

Objectives

The primary objective of the present invention is to provide a means of increasing the overall efficiency of large scale desalination systems by significantly reducing the energy input requirement and make recoverable energy (solar) sources affordable. Another object of the invention is to provide a means of using evacuated space (partial vacuum) insulation that prevents heat from escaping into the atmosphere. The invention also includes means for reusing the heat energy repeatedly to preheat the incoming sea water. The invention also provides a method for evaporating the heated sea water into a density-saturated vapor under a partial vacuum. It also provides a means for condensing the vapor into fresh distilled water and capturing and re-using the heat-of-condensation to preheat the input sea water. A further object of the invention is to provide means for separating the dissolved solids from the liquid water and still further means for continually removing the solids from the system without interruption. A further object of the invention is to provide means for removing the heat energy from the hot removed solids and reusing it to preheat the input sea water.

Other objects of the present invention will become better understood with reference to the appended Summary, Description and Claims.

SUMMARY

A desalination system for substantially increasing the efficiency of the distillation of ocean and brackish water by continuously reusing heat energy to reduce the overall energy requirements, comprised of basic assemblies, including an evaporation chamber, a vapor transfer assembly, and a condensing chamber, that are surrounded by a secondary wall, wherein the space between the secondary wall and the basic assemblies is placed under low partial vacuum to maintain very low conductive and convection heat loss.

An external water heater source feeds heated input sea water into the evaporation chamber through a plurality of spray nozzles, which transforms the sea water into droplet-mist that flash vaporize into a density-saturated vapor. The density-saturated vapor is sucked through the vapor transfer assembly by a vacuum pump assembly. The solids that remain from the flash vaporization fall to the bottom of the evaporation chamber. Any droplet-mist that does not vaporize is prevented from entering the vapor transfer assembly by a demister. The density-saturated vapor is discharged through the vacuum pump assembly and is forced into the condensing chamber located below the vacuum pump assembly. The pressure increase resulting from the discharge output of the vacuum pump assembly provides a pressure that transforms the density-saturated vapor into a vapor-liquid state and moves it into a heat exchanger. The heat exchanger is then continuously cooled by intake sea water distributed by a ratio valve through an intake channel into a heat-exchanger port. This condenses the liquid-vapor into pure liquid water. At the same time, the intake sea water is heated by its contact with the heat exchanger. The heated intake sea water is then transferred to the external water heater source through a vacuum insulated channel to be fed back into the evaporation chamber.

The ratio valve also distributes intake sea water to the bottom of the evaporation chamber to cool the solids that fall and collect and the bottom. This is done by distributing the intake sea water through a first chamber port into cooling coils to cool the solids. The intake sea water itself becomes hot in this process, and is transferred back to the external water heater source through a vacuum insulated channel. The heated intake sea water can then be fed into the evaporation chamber.

Although particular embodiments of the present invention have been described in the foregoing description, it is to be understood that the present invention is not to be limited to just the embodiments disclosed, but that they are capable of numerous rearrangements, modifications and substitutions without departing from the description herein.

REFERENCE NUMERALS

Figure 1:
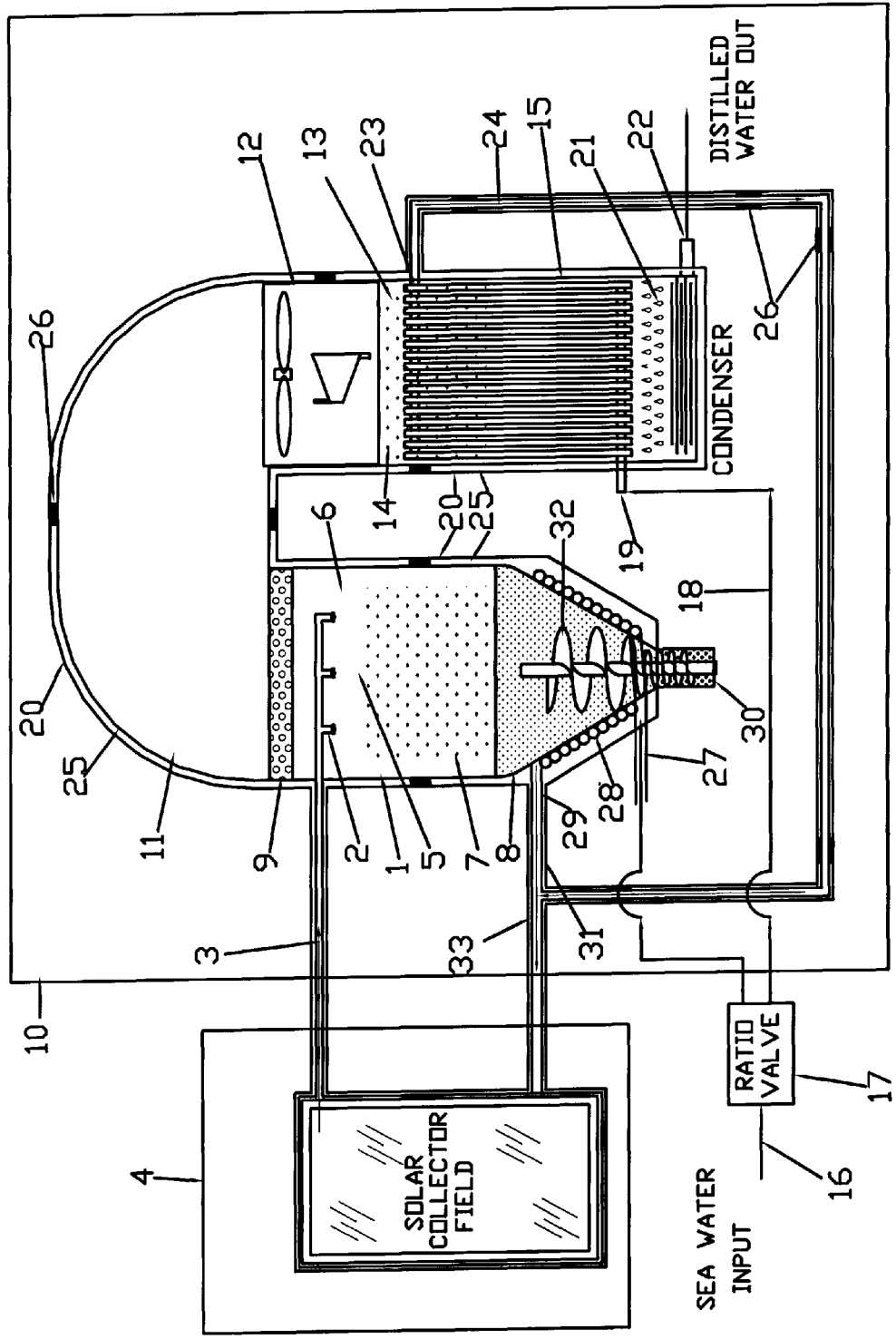
FIG. 1 is a diagrammatic representation of a desalination plant incorporating features of the present invention.

1 . . . evaporation chamber
2 . . . plurality of spray nozzles
3 . . . heated input sea water
4 . . . an external water heater source
5 . . . fine droplet-mist
6 . . . a density-saturated vapor
7 . . . remaining solids
8 . . . bottom of the evaporation chamber
9 . . . demister
10 . . . desalination system
11 . . . vapor transfer assembly
12 . . . vacuum-pump assembly
13 . . . a condensing chamber
14 . . . vapor-liquid
15 . . . heat-exchanger
16 . . . intake sea water (Sea Water Input)
17 . . . ratio valve
18 . . . intake channel
19 . . . heat-exchanger port
20 . . . secondary wall
21 . . . pure liquid water
22 . . . condensing chamber port
23 . . . heat-exchanger exit
24 . . . vacuum insulated channel
25 . . . space between the assemblies and the secondary wall
26 . . . insulation material
27 . . . first bottom chamber port
28 . . . cooling coils
29 . . . second bottom chamber port
30 . . . outlet
31 . . . vacuum-insulated channel
32 . . . auger
33 . . . preheated input sea water

DETAILED DESCRIPTION

Referring to the drawings, FIG. 1 is a representative view of the preferred embodiment of the desalination system 10 showing all of the basic assemblies and plumbing surrounded by a secondary wall 20. The space 25 between the assemblies and the secondary wall 20 is under low partial vacuum, between 0.001 and 1 Torr (0.1333 to 133.3 pascal), thereby maintaining very low conductive and convection heat loss. The space 25 can be partially or totally filled with an insulation material 26 for structural support. Perlite is used for the structural support in the preferred embodiments as it exhibits a thermal conductivity of 0.031 W/m*K that improves to 0.00137 W/m*K under partial vacuum.

Figure 3:
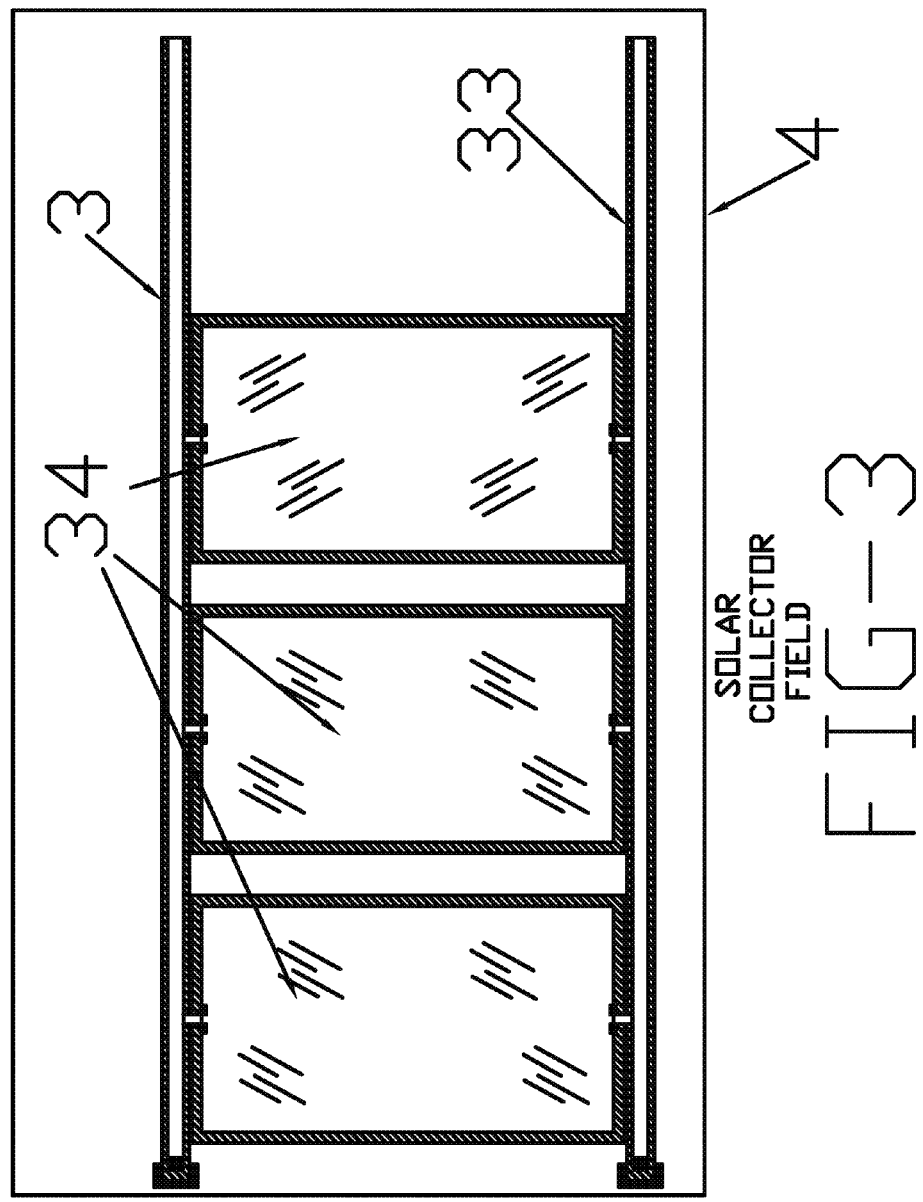
FIG. 3 is a diagrammatic representation of a solar collector incorporating features of the present invention.

Still referring to FIG. 1, the assemblies include an evaporation chamber 1 that houses a plurality of spray nozzles 2 being fed heated input sea water 3 from an external water heater source 4. The preferred external water heater source 4 comprises a solar collector 34 (see FIG. 3), although fossil fuel energy source can be used especially in poor solar areas. The plurality of spray nozzles 2 are designed to provide fine droplet-mist 5 that flash vaporize into a density-saturated vapor 6. The evaporation chamber 1 is under partial vacuum generated by a vacuum pump assembly 12. The vacuum pump assembly 12 is designed to ensure that the pressure in the evaporation chamber 1 is well below the saturation vapor pressure over the range of input water 3 temperature. As the droplet-mist 5 vaporize, the remaining solids 7, being heavier than the surrounding density-saturated vapor 6, fall and collect at the bottom 8 of the evaporation chamber.

Figure 2:
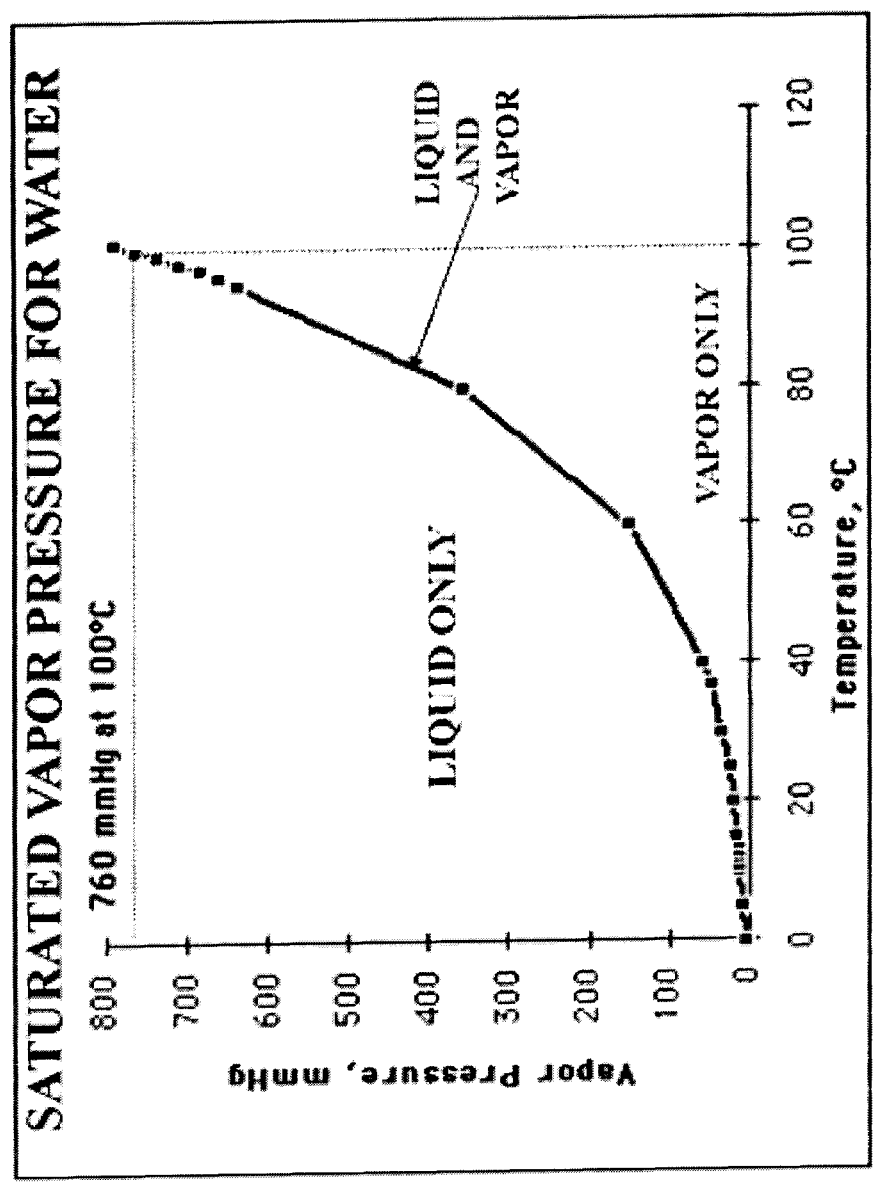
FIG. 2 is a graphic view of the saturated vapor pressure curve for water.

Referring to FIG. 2, FIG. 2 is a graphical view of the "Vapor Pressure Curve of Water" showing vapor pressure and the corresponding temperature at which water vapor and liquid can coexist in equilibrium. At any given temperature on the curve, if the pressure is increased, the water can exist only as liquid. If the pressure is decreased, the water can exist only as vapor.

Now referring back to FIG. 1, so long as the temperature of the fine droplet-mist 5 is sufficiently high and the pressure in the evaporation chamber 1 is sufficiently low, the fine droplet-mist 5 will become a density-saturated vapor 6 leaving all remaining solids 7 (e.g., previously dissolved salt) behind. Directly above the plurality of spray nozzles 2 is the demister 9 which prevents the fine droplet-mist 5 from entering the vapor transfer assembly 11. The vapor transfer assembly 11 connects the top of the evaporation chamber 1 to the vacuum pump assembly 12 and provides a means for the density-saturated vapor 6 to transfer between the evaporation chamber 1 and the vacuum pump assembly 12. The density-saturated vapor 6 is drawn through the demister 9 by the vacuum pump assembly 12. A condensing chamber 13 is mounted below the vacuum pump assembly 12. The discharge output of the vacuum pump assembly 12 provides a pressure increase within the condensing chamber 13. The increased pressure forces the density-saturated vapor 6 into the state of vapor-liquid 14 and to move into a heat exchanger 15. The heat-exchanger 15 is continually cooled by the intake sea water (sea water input) 16 that is distributed by a ratio valve 17 through an intake channel 18 into a heat-exchanger port 19. The liquid-vapor 14 is cooled within the heat-exchanger 15 and further condenses into pure liquid water 21. The pure liquid water 21 exits the heat exchanger 15 at a temperature near the intake sea water 16 temperature through a condensing chamber port 22. The intake sea water 16 that enters the heat-exchanger 15 through the ratio valve 17, intake channel 18, and heat-exchanger port 19 is heated by the heat-of-condensation of vapor-liquid 14 and is transferred from the heat-exchanger exit 23 through a vacuum insulated channel 24 as preheated input seawater to the external water heater source 4 (solar collector field). Intake sea water 16 is also distributed by the ratio valve 17 through a first bottom chamber port 27 into cooling coils 28 and cools the remaining solids 7 that collect at the bottom 8 of the evaporation chamber. As the intake sea water 16 is heated by the remaining solids 7, it exits the cooling coils 28 through a second bottom chamber port 29 and is transferred through a vacuum insulated channel 31 as preheated input sea water 33 to the external water heater source 4. The remaining solids 7 are periodically or continuously removed from the bottom 8 of the evaporation chamber through an outlet 30 by an auger 32. The ratio valve 17 adjusts the intake sea water 16 flow rate through the heat-exchanger and cooling coils 28 to ensure minimum heat loss and maximum heat recovery. The bottom 8 of the evaporation chamber, including the auger 32, may be modified or changed to other methods of removing remaining solids 7 depending on the quality and filtering method of the intake sea water 16. If the sea water is pumped from beach wells or sub-surface intakes that remove all un-dissolved solids, the remaining solids 7 may be used for sea salt. The beach wells or sub-surface intakes will also greatly reduce the intake of solvents that have boiling points lower than water that could potentially contaminate the distilled water. In the preferred embodiment, the heat exchanger 15 is a Plate Heat Exchanger (PHE) as opposed to other types for overall performance and maintenance. The type of vacuum pump assembly 12 is also optional, depending on the size (m 3/day) of the overall system and where it is to be located. Flash evaporation is used in the preferred embodiment; however, it is apparent that almost any type of heat base desalination could be greatly improved by using vacuum insulation.

All features disclosed in this specification, including any accompanying claims, abstract, and drawings, may be replaced by alternative features serving the same, equivalent or similar purpose, unless expressly stated otherwise. Thus, unless expressly stated otherwise, each feature disclosed is one example only of a generic series of equivalent or similar features.

Although preferred embodiments of the present invention have been shown and described, various modifications and substitutions may be made thereto without departing from the spirit and scope of the invention. Accordingly, it is to be understood that the present invention has been described by way of illustration and not limitation

What is claimed is:

1. A method for substantially increasing the efficiency of the distillation of ocean and brackish water by continuously reusing heat energy to reduce overall energy requirements, comprising the steps of:
    a. installing a second wall around a desalination system comprised of basic assemblies including an evaporation chamber, a vapor transfer assembly, and a condensing chamber;
    b. maintaining a low partial vacuum in the space between the second wall and the basic assemblies;
    c. partially or totally filling the space between the second wall and the basic assemblies with an insulation material for structural support;
    d. feeding heated input sea water into the evaporation chamber through a plurality of spray nozzles, wherein the heated input sea water comes from an external water heater source;
    e. transforming the heated input sea water into droplet-mist that flash vaporize into a density-saturated vapor through use of the plurality of spray nozzles;
    f. maintaining the evaporation chamber under partial vacuum, generated by a vacuum pump assembly, so that the pressure in the evaporation chamber is well below the saturation vapor pressure over the range of input water temperature;
    g. removing solids that remain from the droplet-mist that flash vaporize in the evaporation chamber and fall and collect at the bottom of the evaporation chamber;
    h. preventing the fine droplet-mist from entering the vapor transfer assembly by way of a demister;
    i. transferring the density-saturated vapor between the evaporation chamber to the vacuum pump assembly by way of the vapor transfer assembly, wherein the density-saturated vapor is drawn through the demister by the vacuum pump assembly;
    j. transforming the density-saturated vapor into a vapor-liquid state and moving the vapor-liquid into a heat exchanger by mounting the condensing chamber below the vacuum pump assembly so that the discharge output of the vacuum pump assembly provides a pressure increase within the condensing chamber that forces the density-saturated vapor into a vapor-liquid state and further forces it into heat exchanger;
    k. condensing the liquid-vapor into pure liquid water by continually cooling the heat-exchanger with intake sea water that is distributed by a ratio valve through an intake channel into a heat-exchanger port; and
    l. transferring the intake sea water, now heated by the heat-of-condensation of vapor-liquid, from a heat-exchanger exit through a vacuum insulated channel to the external water heater source to be fed back into the evaporation chamber,
    m. distributing intake sea water from the ratio valve through a first bottom chamber port into cooling coils to cool the solids that collect at the bottom of the evacuation chamber; and
    n. transferring the intake sea water, now heated by the solids, from the cooling coils to the external water heater source by way of a second bottom chamber port and a vacuum insulated channel leading to the external water heater source.

2. The method of claim 1, wherein the ratio valve adjusts the intake sea water flow rate through the cooling coils to ensure minimum heat loss and maximum heat recovery.

3. The method of claim 1, wherein the ratio valve adjusts the intake sea water flow rate through the heat-exchanger to ensure minimum heat loss and maximum heat recovery.

4. The method of claim 1, wherein ambient sea water is heated at least in part by solar energy to create the heated input sea water.

* * * * *